United States Patent Office 2,918,496
Patented Dec. 22, 1959

2,918,496

METHOD OF PREPARING NOPALDEHYDE AND HYDRONOPALDEHYDE

Albert B. Booth, Houston, Tex., assignor to The Glidden Company, Cleveland, Ohio, a corporation of Ohio No Drawing. Application July 15, 1957
Serial No. 671,717

5 Claims. (Cl. 260—598)

This invention concerns a method of preparing a pinane aldehyde. It is concerned more particularly with an improved method of preparing hydronopaldehyde in increased yields over prior methods of preparing it.

It is generally recognized that chemical oxidation of primary alcohols to aldehydes usually results in relatively poor yields of aldehydes and a considerable amount of by-products such as esters and acids, and in some cases ethers and other undesirable products. Thus, the oxidation of hydronopol by known chemical oxidizing agents similarly results in low yields of the adehyde. It should be recognized, however, that there are exceptions to this general rule since, as is known, a few classes of alcohols, e.g., some aromatic and allylic alcohols, oxidize to aldehydes in excellent yield. The results obtained are, however, considerably dependent upon the structure of the alcohol and are often unpredictable and unexpected.

Accordingly, an object of my invention is an improved method for the preparation of a pinane aldehyde.

Another object of my invention is a method for the preparation of improved yields of a pinane aldehyde from a readily available raw material source.

A further object of my invention is a method of preparing improved yields of hydronopaldehyde and a novel compound, nopaldehyde.

Other objects will be apparent from a description of my invention to be given hereinafter.

In accordance with the above objects of my invention, I have found that I can prepare improved yields of hydronopaldehyde over prior art chemical oxidation methods by a process comprising heating an alcohol selected from the group consisting of nopol and hydronopol in the sole presence of a hydrogenation catalyst. By the process of my invention, I have succeeded in preparing hydronopaldehyde in yields as high as 75 percent or better, as will be shown in the examples below.

Both of the starting pinane alcohols of my invention, nopol by condensing nopinene (β-pinene) with anhydrous scribed in prior art publications. Nopol, for example, is disclosed and claimed in U.S. Patent No. 2,340,294 to J. P. Bain. The patentee describes the preparation of nopol by condensing nopinene (β-pinene) with anhydrous formaldehyde at temperatures of from about 100 to 250° C., either in the presence or absence of non-resinifying acid catalysts, such as acetic acid, zinc chloride and the like. Hydronopol can, in turn, be prepared in high yields from nopol by hydrogenating nopol in the presence of a catalyst at pressures of from 1000 to 1500 lbs./sq. in. at a temperature of 180 to 200° C., as described in U.S. Patent No. 2,427,345, also to J. P. Bain. Thus, it can be readily seen that starting from nopinene, which is one of the major constituents of turpentine, I can readily prepare the starting pinane alcohols of this invention. It should be understood, however, that I do not desire to be limited to the methods of preparing nopol and hydronopol disclosed above, since these methods form no part of this invention and are given only as illustrative methods of preparing them. Other known methods can be employed if desired, since my invention is concerned only with converting said known alcohols to hydronopaldehyde, and in the case of nopol also to nopaldehyde, which is believed to be a new compound.

The discovery that nopol and hydronopol could be converted to hydronopaldehyde could not have been predicted because: Nopol is known to be thermally unstable. It is a substituted alpha-pinene member, and according to Simonsen, "The Terpenes," vol. II, p. 134, 2d ed., α-pinene is converted to aromatic hydrocarbons when vaporized over copper, nickel, cobalt and iron catalysts. As will be shown hereinafter, nopol undergoes rearrangement to hydronopaldehyde, even when the catalyst is selected from the above list known to aromatize alpha-pinene. Thus, the rearrangement of the hydrogen in nopol to yield hydronopaldehyde and the removal of the unwanted hydrogen from hydronopol also to give a high yield of hydronopaldehyde in accordance with the process of my invention was indeed unexpected. I have found that despite the strained ring system of hydronopol and nopol, they can be converted to hydronopaldehyde preserving the ring intact and in yields greatly superior to those obtainable by chemical oxidation methods.

As catalysts that can be employed in the process of my invention, I can use hydrogenation catalysts comprising an element having an atomic weight between 58 and 64. Exemplary of such hydrogenation catalysts which are applicable to the process herein disclosed are copper chromite, nickel, Raney cobalt, copper carbonate, co-precipitated hydroxides of copper, nickel and manganese, and the like.

In a preferred embodiment of my invention, I have found that I can prepare hydronopaldehyde in substantial yields by distilling hydronopol or nopol over a hydrogenation catalyst, in the absence of added hydrogen, at a temperature high enough to cause a substantial rate of reaction, but not so high so that the pinene nuclei are affected.

In another embodiment of my invention, I have found that I can prepare hydronopaldehyde by passing hydronopol or nopol in the vapor phase over a hydrogenation catalyst in the absence of added hydrogen and at a high temperature and short contact time.

In either embodiment of my invention, after causing substantial conversion of the hydronopol or nopol to hydronopaldehyde, I can recover the products during distillation by taking advantage of the lower boiling point of the aldehyde in comparison to that of the alcohols.

The reaction of the alcohols, in the preferred embodiment of my invention, is advantageously carried out in an ordinary column still. This is so, since the aldehyde boils at a lower temperature than the alcohol charged to the still and by adjusting the operating temperature by utilization of a suitably diminished pressure on the still, I can distill off the aldehyde formed. The unreacted alcohol which vaporizes with the aldehyde can thereafter be separated and returned to the still pot containing the catalyst for further conversion.

By operating the still continuously as described, i.e., recycling unreacted alcohol, the alcohol is in contact with the hydrogenation catalyst for extended periods of time, and accordingly somewhat limits the temperatures employed during the conversion reaction. In general, the reaction does not achieve appreciable rate below about 100° C., and a probably safe upper maximum temperature is in the order of about 220° C. for prolonged heating of the alcohols in the presence of the hydrogenation catalysts of my invention.

In that embodiment of my invention wherein I convert hydronopol or nopol to hydronopaldehyde in the vapor phase, I have found that I can employ higher conversion temperatures and shorter contact times. In this embodiment, for example, using a flow-type apparatus to pass the alcohol vapors over the hydrogenation catalyst, I can employ temperatures as high as 400° C. for very short contact times, i.e., of the order of a few seconds. Lower temperatures can, of course, be employed with an attendant increase in contact time of the alcohol vapor and catalyst.

I have found that I can advantageously employ subatmospheric pressures in conducting the conversion of the alcohols to the desired aldehyde. I am thus able to effect a separation of the lower boiling aldehyde during subatmospheric distillation of the alcohol in contact with the catalyst. It is within the scope of my invention, however, to use atmospheric and higher pressures, and accordingly it is to be understood that the examples to be given hereinafter are not limited to the specific pressures disclosed.

As has been indicated heretofore, the rearrangement of nopol to hydronopaldehyde requires the removal of a hydrogen atom from the alcohol group and its addition to the double bond in the ring. This is accomplished by the process of my invention despite the use of catalysts known to cause aromatization of the α-pinene family members. However, due to the nature of the reaction involved in the rearrangement of nopol to hydronopaldehyde, there is always formed, more or less, some nopaldehyde. The formation of nopaldehyde is believed to result from the dehydrogenation, rather than the rearrangement, of nopol, and this tends to become more pronounced with the amount and activity of the hydrogenation catalyst used. Since nopaldehyde is an unsaturated aldehyde containing the pinene nucleus, it tends to undergo resinification quite readily. Accordingly, if it is desired to produce pure hydronopaldehyde for chemical or other uses, it is desirable to avoid the conditions which lead to the formation of nopaldehyde as a contaminant. On the other hand, if it is desired to produce greater yields of nopaldehyde for use in the preparation of, for example, aldehyde polymers, then this more reactive nopaldehyde can be readily produced by employing conditions leading to its formation, e.g., using larger amounts of catalyst, as will be shown in the examples or by heating nopol in the vapor phase. It should be mentioned here that dehydrogenation of the hydronopaldehyde produced does not result in the production of nopaldehyde as the reaction is normally carried out.

Suitable amounts of catalysts that can be employed in the process of my invention are from 1 to 10 percent by weight. These quantities of catalyst apply to a batch distillation process. In the case of a vapor phase rearrangement, it is only necessary to pack a tube capable of being heated with the catalyst suitably supported. The vapors of nopol or hydronopol pass through the tube and will be converted. Thus, the catalyst may be capable of converting several hundred times its weight of product before its activity decreases to an uneconomic level. In this connection, it also might be well to point out that fresh nopol or hydronopol can be added to the stillpot during the rearrangement or dehydrogenation as product is removed from the top of the still. The process thereby becomes a continuous process which can be operated until the catalyst activity declines to such an extent that either more catalyst must be added or the reaction stopped and the old catalyst removed and replaced. The amount of the catalyst will probably also depend on the identity of the catalyst as well as variables such as the purity of the nopol or hydronopol which might influence catalyst life appreciably. The quality of catalyst is therefore not critical and is somewhat difficult to define.

The following examples, which are by way of illustration only, demonstrate the practice of this invention.

*Example 1*

Five hundred grams of hydronopol and 25 grams of commercial copper chromite catalyst were charged to the pot of a 1" x 48" column still packed with Cannon "protruded packing." The distillation was carried out at 100 mm. absolute pressure. The column was put under total reflux in starting up the reaction and when the head temperature indicated that hydronopaldehyde was concentrating in the distilling head, it was removed at such a rate that it was possible to maintain the head temperature at 161° to 165° C. This control was effected by choosing a reflux ratio such that the bulk of the unconverted hydronopol was returned to the pot, which was at a temperature of from 180 to 190° C. during most of the reaction, while hydronopaldehyde of about 75% purity or greater was removed as rapidly as possible without permitting the distilling temperature at the head to rise above 165° C. The pot temperature was somewhat higher than the optimum but could have been lowered by the use of a lower pressure.

Three hundred eighty-four grams of distillate was collected by the time the pot reached a temperature of 200° C., at which time the reaction was stopped. The residue remaining was steam distilled and some unreacted hydronopol was recovered. In this experiment the distillate was nearly pure hydronopaldehyde, i.e., a yield of over 95 percent.

*Example 2*

Two hundred grams of hydronopol and ten grams of a commercial nickel fat-hardening catalyst were charged to the pot of a column still as in Example 1. The same distillation procedure as in Example 1 was used in this case, i.e., a pressure of 100 mm. absolute with the column under total reflux in starting up the reaction. Again, when the head temperature indicated that hydronopaldehyde was concentrating in the distilling head, it was removed at such a rate that it was possible to maintain the head temperature at about 160° C. The control was effected as before but the reaction in this example was stopped when the pot temperature reached about 220° C. A total of 94 grams of distillate was collected. In this example, the nickel catalyst was somewhat less effective than the copper chromite catalyst, although substantial yields of hydronopaldehyde were obtained by operating under the above conditions.

*Example 3*

Three hundred grams of hydronopol and two grams of commercial copper carbonate, along with 1.5 grams of commercial lime, were charged to the pot of a column still as in the examples above. The copper carbonate and lime form an active copper catalyst at the reaction temperatures employed. The reaction in this example was carried out as in the preceding examples, and 116 grams of product was taken off at a head temperature of about 160° C. and a 100 mm. Hg absolute pressure. The reaction was stopped when the pot reached a temperature of 200° C.

*Example 4*

An experiment identical with Example 3 was carried out except that in this instance a Raney cobalt catalyst was employed. The yield of hydronopaldehyde in this example was substantial but less than with the copper catalyst.

The following example illustrates the preparation of hydronopaldehyde and nopaldehyde from nopol.

*Example 5*

One thousand grams of freshly redistilled nopol and 50 grams of commercial copper chromite were charged to the pot of a 1" x 48" column still packed with Cannon "protruded packing." The reaction was carried out at 100 mm. Hg absolute head pressure. As in Example 1, the column was put under total reflux in starting up the reaction, and when the head temperature, in this case 158° C., indicated that hydronopaldehyde was concentrating in the distilling head, it was removed at such a rate that it was possible to maintain the head temperature at about 158° C. This control was effected by choosing a reflux ratio as before, and the reaction was stopped when the pot reached a temperature of about 200° C. About 754 grams of distillate was collected consisting largely of hydronopaldehyde and nopaldehyde but also containing about 12 percent nopol and a little hydrocarbon. A residue of 271 grams was left, which contained the catalyst. The loss and column holdings amounted to a total of 25 grams.

The residue was thereafter steam distilled to yield a distillate consisting largely of hydronopol. The non-steam volatile portion consisted in part of hydronopyl hydronopate and some unidentified material.

Example 6

In this example, which was carried out as in Example 5, except that the catalyst was reduced to 2½ percent, the distillate came over more slowly. It contained less nopaldehyde but the amount of unreacted nopol was increased.

Upon fractionation of the crude product obtained by Example 5, there was obtained a light cut rich in alpha-nopaldehyde. This cut was used to prove the structure of the alpha-nopaldehyde as follows:

Five grams of the cut was diluted with a little light naphtha, and to this was added 0.2 gram of platinum oxide catalyst. Hydrogenation was thereafter carried out in a Parr apparatus at room temperature and superatmospheric pressure. The reaction consumed one mol of hydrogen per mol of the aldehyde, at which time it practically ceased. Examination of the hydrogenated product by infrared spectrophotometry showed that the aldehyde group had been quantitatively reduced and the resulting product was rich in nopol. The product also contained some hydronopol, since the starting aldehyde contained some hydronopaldehyde.

The preparation of hydronopaldehyde from nopol, although superior to prior chemical oxidation methods, was somewhat less satisfactory than from hydronopol. There are a few factors contributing to this, such as, for example, the small difference in boiling point between hydronopaldehyde and nopol which makes it more difficult to remove the aldehyde as rapidly as it is formed without taking over some nopol in the distillate; and the fact that alpha-nopaldehyde readily resinifies also contributes somewhat to this difficulty. Some of these difficulties can be eliminated, however, by assaying the distillate for aldehyde, etc., during the reaction.

In order to show the adaptability of the process of my invention to vapor phase conversion of the alcohols disclosed herein, the following experiment was performed:

Example 7

A vapor phase reaction apparatus was set up and consisted of a 1″ x 48″ heated Pyrex tube packed for 36″ with a commercial copper chromite catalyst supported on 8/14 mesh pumice. Hydronopol was then flash-vaporized and the vapor was passed through the tube while maintaining it at 275° C., at such a rate that two liters of the hydronopol was processed over a two-hour run. Examination of the condensed product which was collected over the two-hour period showed that it averaged about 70 percent hydronopaldehyde.

Hydronopaldehyde,

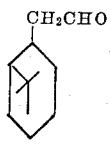

as produced by the process of this invention, is characterized by the following properties:

Boiling point _____ 101° C. at 10 mm. Hg absolute.
Density 25/15.5 _____ 0.958.
Refractive index ($N_D^{25}$) 1.4785.
Optical rotation $\alpha_D^{25}$ __ —15.1° (10 cm. tube)

The compound forms a bisulfite adduct from which it can be regenerated.

The nopaldehyde, also prepared by the process herein disclosed, is of the alpha-pinene form,

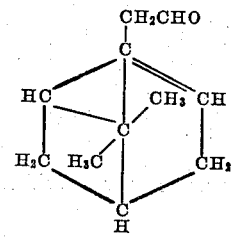

and is characterized by great reactivity. The compound is difficult to obtain and keep in pure condition, and, accordingly, the properties of the best material isolated are as follows:

Boiling point _____ 94° C. at 10 mm. Hg absolute.
Density 25/15.5 _____ 0.94.
Refractive index ($N_D^{25}$) _____ 1.482.
Optical rotation $\alpha_D^{25}$ _____ —11° (10 cm. tube).

The compound forms a bisulfite adduct from which it is not regenerated.

Hydronopaldehyde is a valuable compound obtainable in high yields by the process of this invention and from readily available raw materials. Hydronopaldehyde is a useful intermediate for the preparation of hydronopic acid which has been found to exhibit powerful fungicidal and the like properties. Hydronopic acid is also useful as a resolving agent for alcohols such as menthol or amines. Hydronopaldehyde can be converted to hydronopic acid by the method disclosed and claimed in my copending application Serial No. 671,696, filed July 15, 1957. Briefly, in said copending application, I can convert hydronopaldehyde by the following procedure:

Example 8

Fifty cc. of hydronopaldehyde was charged to a 100 cc. graduated cylinder and thereafter air was passed in through a fritted glass disperser as rapidly as the foaming permitted. The temperature rose rapidly and was held at 50° C. by external cooling. After a considerable amount of the aldehyde had oxidized, the evolution of heat decreased, and it was necessary to use external warming to hold the temperature at 50° C. After passing in air for 11 hours, the reaction was stopped and the product was found to titrate 80 percent hydronopic acid. Upon cooling to room temperature, the product solidified to white crystals of hydronopic acid.

Nopaldehyde, besides being useful for the preparation of nopol by hydrogenation, can also be selectively hydrogenated to hydronopaldehyde. Additionally, the compound can be condensed with acetone to produce a pleasant smelling ketone which can be used as an odor or flavor chemical. The resins prepared by the polymerization of nopaldehyde can be used as plasticizers, etc. Other uses of nopaldehyde will be apparent to those skilled in the art.

The process of my invention can be adapted to produce hydronopaldehyde and nopaldehyde on a commercial scale either in a continuous or batch method. In a continuous, as well as in a batch method, the unreacted charge alcohol taken off with the distillate can be advantageously separated and recycled to the reaction zone, as will be understood by those skilled in the art.

Other modifications and equivalents can be adapted

I claim:

1. A process for preparing hydronopaldehyde which comprises isomerizing nopol in the sole presence of a hydrogenation catalyst containing an element having an atomic weight between 58 and 64.

2. A process for preparing hydronopaldehyde containing also nopaldehyde which comprises heating nopol in the sole presence of a hydrogenation catalyst containing an element having an atomic weight between 58 and 64 at a temperature of above 100° C. to about 400° C.

3. A process for preparing a mixture of hydronopaldehyde and nopaldehyde which comprises heating nopol in the sole presence of a hydrogenation catalyst containing an element having an atomic weight between 58 and 64 at a temperature of above 100° C. to about 400° C. in a reaction zone and removing said mixture of hydronopaldehyde and nopaldehyde from the reaction zone substantially as soon as formed.

4. A process for preparing hydronopaldehyde by isomerizing nopol, which comprises contacting said alcohol in the sole presence of a catalyst selected from the group consisting of copper chromite, nickel, Raney cobalt and copper carbonate in a reaction zone and at a temperature above 100° C.

5. A process according to claim 4 wherein said catalyst is copper chromite.

References Cited in the file of this patent

UNITED STATES PATENTS

| | | |
|---|---|---|
| 2,427,343 | Bain | Sept. 16, 1947 |
| 2,746,993 | Dean | May 22, 1956 |

OTHER REFERENCES

Simonsen: The Terpenes, 2nd ed., vol. II (1949), p. 223.